Sept. 17, 1968       M. A. ROHRLICK       3,401,905
PARACHUTE LOW ALTITUDE DELIVERY SYSTEM
Filed Oct. 6, 1966                3 Sheets-Sheet 1
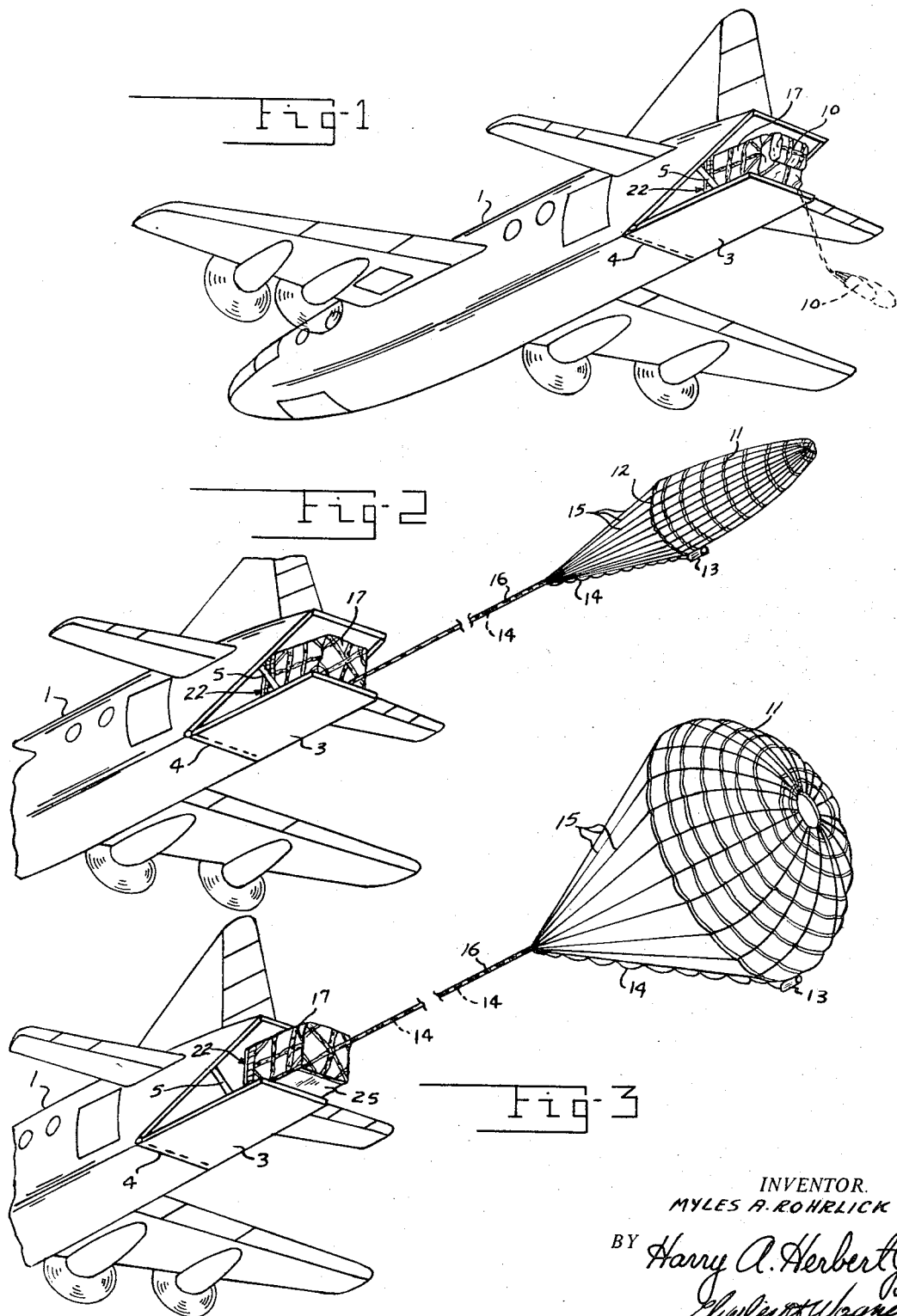
INVENTOR.
MYLES A. ROHRLICK
BY Harry A. Herbert Jr.
and Charles W. Wagner
ATTORNEYS

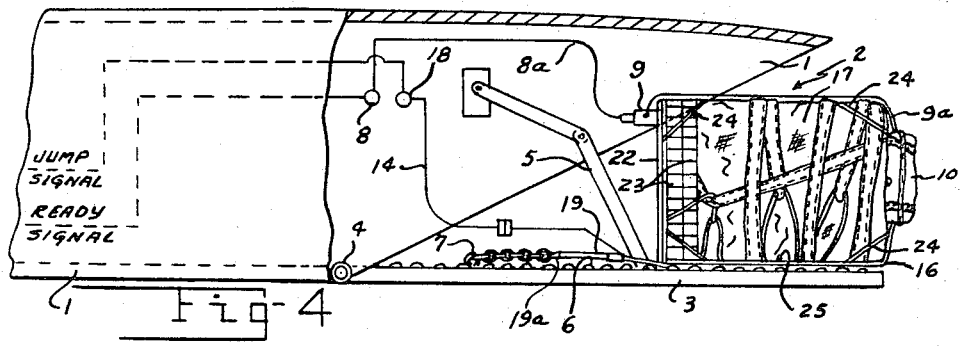
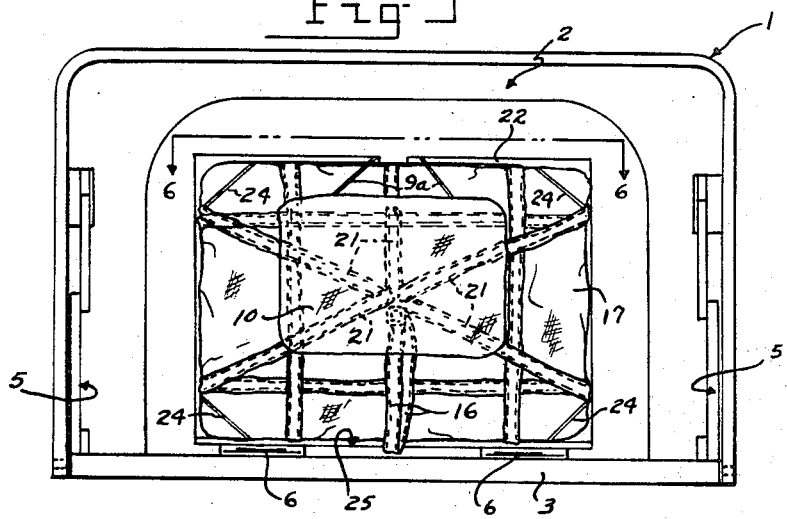
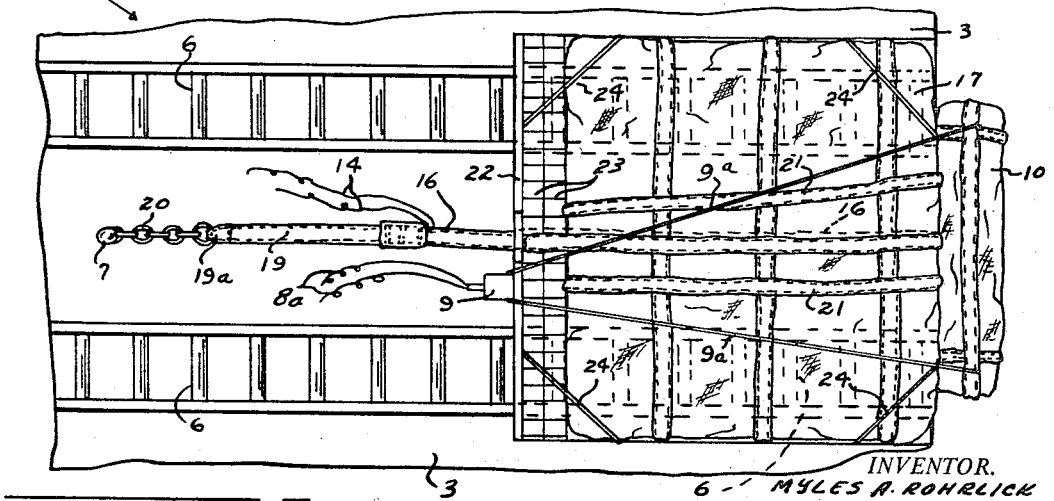

Sept. 17, 1968  M. A. ROHRLICK  3,401,905
PARACHUTE LOW ALTITUDE DELIVERY SYSTEM
Filed Oct. 6, 1966  3 Sheets-Sheet 3
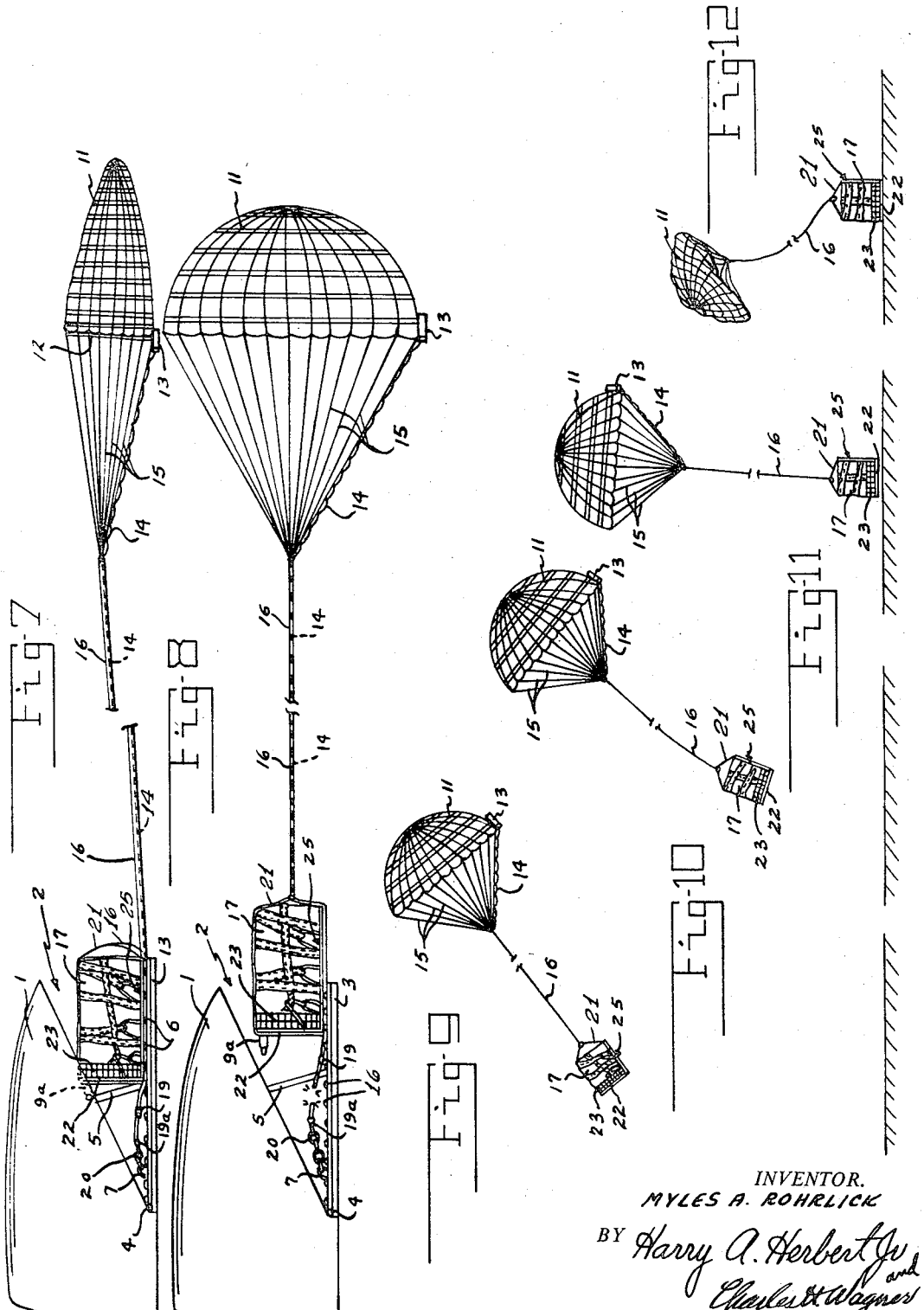
INVENTOR.
MYLES A. ROHRLICK
BY Harry A. Herbert Jr
and
Charles K. Wagner
ATTORNEYS

United States Patent Office 3,401,905
Patented Sept. 17, 1968

3,401,905
PARACHUTE LOW ALTITUDE DELIVERY SYSTEM
Myles A. Rohrlick, 5 Maume Circle,
Hampton, Va. 23366
Filed Oct. 6, 1966, Ser. No. 585,227
9 Claims. (Cl. 244—137)

ABSTRACT OF THE DISCLOSURE

An aerial cargo delivery system and apparatus for selectively delivering cargo at low levels from a cargo delivery aircraft having a rear cargo receiving and delivery opening and ramp on which the cargo bundle or load is disposed for selective rearward delivery off of the ramp to the ground. Reefed parachute means having a predetermined reefed area is connected to the cargo load by a load suspension line. A first, release means provided in the cargo aircraft for selectively releasing the reefed parachute into the slip stream below and behind the aircraft for deployment in its reefed condition. A "breakaway" retaining connection of predetermined break strength is connected between the load suspension line and the aircraft having a break strength sufficient to resist the pull of the reefed parachute, when deployed but is not sufficient to resist the increased pull on the load suspension line when the chute is subsequently dereefed and expanded to its full drag and load suspension area. A second or parachute dereefing initiating means is provided in the aircraft to selectively dereef the reefed parachute at any selected time to increase the pull on the suspension line and break the "breakaway" connection by the increased pull on the suspension and pull the cargo load off of the ramp for immediate full suspension and lowering by the fully deployed (dereefed) parachute means.

The invention described herein may be manufactured and used by or for the United States Government for governmental purposes without the payment to me of any royalty thereon.

This invention relates to aircraft aerial cargo or load delivery systems and more particularly to parachute delivery systems for low altitude load and cargo bundle delivery, having for an object the provision of means for more precise spotting the delivery of cargo loads etc. by aircraft from predetermined low altitudes at predetermined relatively slow speeds in predetermined relatively small receiving areas, employing a single parachute.

A further object of the invention is to provision of means for aerial delivery of cargo, etc. to the ground by parachute in which a single or main sustaining parachute of predetermined diameter which is attached to the load or cargo is released in reefed predetermined diameter condition but is tethered to the aircraft by calibrated breakaway connecting means which is sufficient to resist pull of the reefed chute and attached load but is not sufficient to resist extraction pull upon dereefing and full deployment thereof, and means within the aircraft for selectively releasing the parachute for reefed deployment and subsequently dereefing the parachute for full deployment, whereby full deployment of the parachute at any predetermined or selected time is sufficient to rupture or break the calibrated breakaway connection and free the dereefed parachute and attached load or cargo for extraction fro mthe aircraft for descent and impact of the suspended load with the ground or a selected load receiving area.

A further object of the invention is the provision of an aerial cargo delivery system and means for cargo aircraft having a rear cargo receiving and delivery opening and ramp, in which the cargo or load is placed on the ramp with a packed reefed parachute of predetermined maximum diameter in predetermined reefed diameter condition which is attached to the cargo or load, and the provision of a calibrated breakaway connection between the parachute or load and the aircraft for restraining extraction of the load or cargo from the aircraft delivery ramp when the chute is released and deployed in its reefed condition to prevent the load from being pulled off the ramp and permit the chute to deploy to its full reefed diameter, including electrical circuit energizing means within the aircraft for releasing the parachute for deployment in its reefed condition at any selected time, in which the restraining strength of the calibrated breakaway connection is sufficient to resist the pull of the reefed parachute but not sufficient to resist pull of the parachute when dereefed and fully deployed, and including a second electrical circuit initiating means within the aircraft connected to the parachute for selectively dereefing the parachute for full deployment, for breaking the breakaway connection and extraction of the cargo load thereby at any selected or predetermined time.

A further object of the invention is the provision of cargo delivery means for predetermined low level and slow speed aerial cargo delivery from cargo and troop carrying rear loading and delivery ramp aircraft, such as the C-123 aircraft, in which only one parachute per bundle of cargo is employed to extract and deliver the load to the ground employing a predetermined maximum diameter ring slot parachute, such as a 22 foot chute reefed to a much smaller diameter, such as four feet, is attached to the cargo load, with an electrically initiated reefing line cutter thereon controlled electrically within the aircraft, and including a calibrated breakaway connection between the parachute or load and the aircraft, in which the drag force exerted by the reefed parachute is not enough to break the calibrated breakaway connection and permit the reefed parachute to extract the load or cargo from the aircraft ramp, but the additional drag force exerted by the fully dereefed and deployed chute is more than sufficient to break the calibrated breakaway connection and extract the cargo load from the ramp of the aircraft, whereby when the chute is released for reefed deployment at a predetermined altitude and air speed and the partially deployed reefed chute is subsequently dereefed at a predetermined low altitude, for instance 200 feet, and a predetermined relatively low aircraft speed, for instance 130 knots, the extracted load and chute will then follow a known predetermined trajectory to point of impact with the ground, and is not materially effected or displaced by excessive cross winds or oscillations, and the cargo can be delivered for impact with the ground within a relatively small selected predetermined area, for instance usually within a 40 foot square area.

A still further object of the invention is the provision of releasable suspension means for suspending a parachute deployment pack containing a packed reefed parachute adjacent the rear end of a cargo load or bundle for aerial delivery on the rear end of the ramp of a cargo delivery aircraft for release and drop of the pack into the aircraft slip stream below the ramp for normal deployment in reefed condition, and selectively operated electrical circuit initiated release means carried by the cargo load or bundle for severing the deployment pack suspending means to initiate free fall of the parachute deployment pack and chute into the slipstream below the aircraft for normal deployment in its reefed condition, and including calibrated breakaway restraining means connected between the parachute and the aircraft for tethering the parachute to the aircraft while in its reefed condition and breakable by additional drag when the chute is fully deployed to release the parachute from the aircraft upon dereefing and full deployment and drag thereof and means within the aircraft for selectively initiating the dereefing of the parachute for full deployment while connected to the aircraft by the calibrated breakaway connecting means.

A further object is the provision of a parachute of the ring slot type packed in predetermined reefed diameter condition, including an electrically initiated reefing line cutter means thereon for dereefing, and electric circuit energizing conduit means for causing dereefing actuation of the reefing line cutter, which is connected at one end to the reefing line cutter and extends along at least one of the parachute shroud line and load suspension and extraction lines into the aircraft for selective energization thereof from within the aircraft after the chute is deployed in reefed condition, to cause the full pull of the dereefed chute to break the calibrated breakaway connection and extract the cargo load or bundle from the aircraft.

A further object of the invention is the provision of a low altitude, cargo bundle or load delivery means for rear ramp loading and aerial delivery cargo, troop, and paratrooper carrying aircraft having separate electric "get ready" (to jump) and "jump" signal means selectively energizable by predetermined personnel in the aircraft, such as the pilot or copilot, and energizing circuit means for releasing the deployment pack containing the reefed parachute for normal deployment of the tethered parachute in predetermined reefed condition connected to be energized by the "get ready" signal means, and an energizing circuit for dereefing the reefed deployed parachute connected to be energized by the "jump" signal means to break the calibrated breakaway connection and permit the extraction of the cargo load or bundle from the aircraft by the fully deployed parachute upon the energization of the "jump" signal means.

Other objects and advantages of the invention will become apparent from the following description and accompanying drawings in which like reference characters refer to like parts in the several figures.

FIG. 1 is a somewhat schematic perspective view of a cargo aircraft in flight having a rear loading and delivery opening and a hinged closure ramp therefor lowered with a cargo load or bundle thereon ready for low altitude delivery by the subject invention, dotted lines depicting the parachute deployment pack and parachute therein released and dropped into the slipstream below the ramp for normal deployment in its reefed condition.

FIG. 2 is a fragmentary schematic perspective view of the aft end of the cargo delivery aircraft after the parachute has deployed to its predetermined reefed diameter and retained or tethered by the calibrated breakaway connection to the floor of the aircraft to resist extraction of the cargo bundle off the rear end of the ramp.

FIG. 3 is a fragmentary schematic perspective view similar to FIG. 2, after the reefed parachute has been dereefed and fully deployed to its maximum diameter sufficient to break the calibrated breakaway restraining means, schematically depicting the load being extracted from the floor of the ramp by the fully deployed parachute.

FIG. 4 is a schematic side view (partly broken away) of the rear portion of an aircraft, such as shown in FIGS. 1 to 3, showing the cargo bundle disposed on the rear or aft end of the ramp with the deployment pack suspended at the rear of the load for free fall into the aircraft slipstream when released and the calibrated breakaway connecting means between a clevis or ring on the floor of the aircraft ramp and the parachute load extraction and suspension line or lines, also schematically showing the "ready" and "jump" signal means to which the deployment pack suspension release means and parachute reefing line cutter energizing circuits are connected for selective energization thereby.

FIG. 5 is a somewhat schematic aft end view showing a cargo bundle in position on the aircraft ramp having the deployment bag containing the packed reefed chute in suspended position for free fall and normal reefed deployment of the chute behind the end of the ramp when the deployment bag suspension means is released or cut.

FIG. 6 is a schematic fragmentary horizontal longitudinal sectional view, more clearly illustrating the cargo bundle on its side on the skid board and in place on the roller conveyors on the floor of the cargo aircraft ramp ready for extraction, and showing the calibrated breakaway connection for restraining the chute and load after deployment of the reefed cargo extraction chute.

FIG. 7 is a fragmentary side view schematically illustrating the extracted chute in its reefed condition with the calibrated breakaway connection restraining the chute and cargo bundle from extraction, also showing the reefing line cutter and energizing circuit therefor connected along the shroud, extraction and load suspension lines, into the aircraft.

FIG. 8 is a similar view, but after the chute has been dereefed and fully deployed, with the calibrated breakaway restraining means broken and the cargo bundle partially extracted from the aircraft.

FIGS. 9, 10, 11 and 12 schematically illustrate the descent or trajectory of the fully deployed parachute and its connected and suspended load to its point of impact on the ground when dropped at a predetermined low altitude and predetermined relatively slow speed, more particularly when employing a "ring slot" parachute of predetermined maximum diameter.

In the drawings the load suspension line has been broken intermediate its end and foreshortened for illustrative purposes only.

Referring to the drawings the reference numeral 1 denotes a cargo, troop and paratrooper jump aircraft, such as an Air Force C–123, having a rear cargo loading and delivery opening 2 adapted to be closed by a forwardly hinged ramp 3. The ramp 3 is hinged at 4 and supported by suitable conventional closing and lowering supports or links 5, and provided with conventional heavy cargo supporting and handling longitudinal roller conveyors 6 mounted or fixed in parallel spaced relation on the floor of the ramp 3 and aircraft floor, and including the conventional load restraining tie down or hold down rings or devices 7 fixed to the floor between the roller conveyors one of which is shown in FIGURES 4 and 6 to 8.

Referring to FIGS. 5 and 6, schematically illustrating the interior of the rear or cargo receiving and delivery portion of a cargo, troop, or paratrooper jump aircraft, the numeral 8 denotes a "ready" or red light signal means suitably located which may be connected by energizing circuit conductor means 8a to the parachute deployment pack suspension or drop line cutter or severing means 9 for dropping the deployment pack 10 containing the reefed parachute 11 into the air or slipstream below the ramp 3 for normal deployment in reefed condition of the load extracting chute 11, as seen in FIGS. 2 and 7.

The chute 11 is reefed to its predetermined smaller diameter, for instance 4 feet, by a reefing line 12 around or adjacent the lower edge of its skirt.

The chute 11 carries an electrically initiated reefing line cutter indicated at 13 for severing the reefing line 12 to allow the canopy to fully deploy to its maximum diameter, for example 22 feet. Electric reefing line cutter initiating circuit conductor means 14 connected to the cutter 13 is secured along one of the parachute shroud lines 15 and along, and preferably within the cargo or load suspension line 16 and under the cargo or bundle 17 to be extracted by the chute 11 when fully deployed to its maximum diameter.

Placing the reefing cutter initiating circuit lines 14 inside the suspension and cargo extraction line 16 protects the lines 14 from breakage or damage during handling, packing and deployment of the chute in its reefed condition.

The reefing line cutter electrical circuit energizing conductors 14 pass under the cargo or bundle together with a portion of the suspension and extraction lines and between the roller conveyors 6 and connected to an energizing circuit within the aircraft, adapted to be selectively energized by aircraft personnel when it is desired to dereef the tethered parachute 11. Preferably, the dereefing electric circuit conductors 14 are connected to the "green or jump" circuit signal outlet 18.

These "ready" and "jump" signals are normally red and green electric signal lights respectively which are selectively energized by the pilot, or copilot of the aircraft. The "ready" signal 8 is employed to indicate the approach to the jump or drop area or zone while the green or "jump" signal 18 indicates the proper or instant time for the "jump" of the paratrooper from the aircraft or for the extraction and drop of the cargo load or bundle when the aircraft 1 is at the calculated altitude, speed and distance from the impact area. The deployment pack suspension line cutter 9a is electrically initiated by the circuit conductors 8a which are selectively energized within the aircraft at the desired time to release and drop the deployment pack 10 into the slipstream for deployment of the tethered reefed parachute 11. These conductors 8a and 14 are preferably connected to the ready or red and jump or green energizing signal 8 and 18. This arrangement places the initial deployment of the reefed tethered parachute and the dereefing, full deployment thereof and extraction of the connected cargo bundle 11 thereby under the direct control of the pilot or copilot who are in the best position to determine the proper approach, reduction in altitude and speed, and extraction and dropping point for the cargo for the necessary trajectory of the cargo bundle to the desired impact area. However, the deployment bag release circuit 8a and the tethered chute dereefing circuit 14 could be selectively closed or energized by personnel in the rear of the aircraft, if desired, upon proper response to the ready and jump signal indicating lamps 8 and 18 at the proper indicated instants.

Referring to FIGS. 4 and 6 the load extraction and suspension lines 16 are brought down from the top of the cargo bundle 17 and partly under the same between the roller conveyors 6 and connected to the calibrated break away connecting strap or extension 19 having a breakaway point 19a which is connected, preferably by a chain 20 of suitable strength, to one of the conventional tie down devices or rings 7 behind the cargo 17 which are securely fastened to the floor at the rear of the cargo bundle 17. The suspension line 16 then extends back under the bundle 17 to its connection to the reefed parachute 11 in the parachute pack 10. The bundle or load 17 to be dropped, as seen in FIGS. 4 and 6, is prepared on a suitable support and before loading in the aircraft is securely contained in a protective wrapper such as a strong cargo container or bag 17a and strapped in place therein including sling straps 21 which are adapted to be connected at the top to the parachute suspension and extraction line or lines 16 and lowered onto an impact board 22 having suitable layers or a thickness of corrugated impact and crushable material 23 thereon and the cargo load container or bag is secured to the impact board 22 by suitable tie tapes 24. A second or skid board 25 is secured to one side of the cargo bundle and container 17 to form the skid or support for the bundle when placed on the roller conveyors 6 in the aircraft.

The bundle 17 is now turned onto its side to rest on the skid board 25 and placed in the aircraft on the conveyors 6 with the impact board 22 facing forward or inward away from the delivery opening. The deployment pack 10 containing the reefed chute 11 is now placed on top of the bundle 17 at or over the top end or rear end with the parachute suspension and extraction line 16 connected to the encircling suspension straps or sling 21 as seen in FIGURE 5 at the top of the bundle and with the light deployment pack suspension line 9a passing through the suspension line cutter 9, to suspend the pack 10 at or on the rear end of the bundle so that it will drop behind the bundle 17 at the rear end of the ramp into the slipstream when the pack suspension line 9a is severed by the cutter 9 that is located behind the impact board 22.

The slack parachute load suspension-extraction lines 16 and other excess portions of the load sling lines or straps 21 are preferably carefully folded to foreshorten and tied in place by very light break cords so that when the deployment pack 10 is released and dropped, and the reefed chute 11 is extracted, these light break cords will break and allow the parachute extraction and suspension lines to extend as the chute is deployed in reefed condition behind the cargo aircraft as seen in FIG. 2. The chute, of course, being tethered to the aircraft by the calibrated breakaway connection 19 until the dereefing energizing circuit 14 is closed to initiate the reefing line cutter 13, and the reefing line is severed thereby to permit the chute to expand to its fully deployed maximum diameter as seen in FIG. 3. The increased drag of the fully deployed chute 11 is then more than sufficient to break the calibrated breakaway connection 19 and extract the cargo bundle or load 17 with its supporting skid board 25 off the roller conveyors 6 and into the air behind the aircraft, as seen in FIGS. 3 and 8. If desired the load 17 may be retained in position after it has been rolled to the outer end of the ramp 3 by breakable chocks (not shown), at least until the calibrated breakaway connection 19 is connected to the hold down ring 7 in the floor of the ramp 3. The chocks, particularly those in the rear of the bundle, can then be removed since the calibrated breakaway 19 and its connection to the intermediate portion of the load suspension line 16 to the top of the cargo bundle may resist rearward movement of the cargo bundle 17 until the extraction and cargo suspension chute 11 is released, dereefed and fully deployed as seen in FIG. 3. Two cargo bundles (not shown) can be simultaneously extracted and dropped by the system when placed side by side on the ramp. However, both cargo bundles should and would be released simultaneously and it may be desirable to provide a connecting web between the two bundles, and connecting the deployment means for one reefed chute so as to be controlled by the initial or prior deployment of the other reefed tethered chute after a brief time delay to allow the first chute to deploy to its initial (reefed) condition.

The chutes to the two loads, after their initial reefed deployment, are retained by their similar calibrated breakaway connections such as 19 until fully dereefed. The dereefing circuits will preferably be energized simultaneously upon energization of the jump signal 18, and the chutes 17 will then be fully deployed to their maximum diameters. The extraction of the two cargo loads thereby, and descent thereof, will be in side by side spaced relation preferably connected together by the connector web. This arrangement will require two pairs of parallel roller conveyors 6 with each of the breakaway restraining means 19 anchored to one of the tie down rings or clevises 7 centrally located between each pair of the conveyors.

Briefly describing the operation, more particularly with a single cargo bundle 17 as shown in the drawings, as the aircraft 1 approaches the drop area, carrying a cargo bundle 17 having a weight of about 1500 pounds and a parachute 11 of about 22 feet diameter reefed down to 4 feet diameter and packed in its substantially conventional deployment bag 10 and suspended at the rear end of the cargo bundle by a light suspension line with a suspension line cutter 9a when about 5 seconds prior to cargo drop time the pilot will energize the red or "ready" light signal 8. This will fire or indicate the firing instant for the deployment bag suspension line cutter 9a to allow the deployment pack 10 to fall behind and below the aircraft and the chute 11 to deploy to its reefed condition as seen in FIGS. 2 and 7 and take up any slack in the breakaway connection 19. The aircraft altitude should be at, or previously reduced respectively to, about 200 feet absolute, plus or minus 25 feet, and speed of 120 to 135 knots. When the aircraft reaches the calculated drop position at the aforesaid altitude and speed of 120 knots the pilot energizes the green or "jump" signal 18 and the reefing line cutter on the reefed chute 13 is fired (electrically) and the chute 11 will immediately fully deploy, particularly so because it is already fully deployed in its reefed condition, and when a ring-slot chute is employed.

The calibrated breakaway connection 19 has a breakaway tensile strength of about 4000 pounds while the pull or drag of the reefed parachute 11 (FIGS. 2 and 7) is materially below this amount. However, the extraction pull or drag of the fully dereefed chute FIGS. 3 and 8 greatly exceeds this breakaway tensile strength of 4000 pounds at the desired cargo drop airspeed of the 120 knots and the breakaway connection 19 is thus broken and the load is almost instantly extracted or snatched off the ramp 3 of the aircraft 1 and will swing down to vertical as impact board 22 impacts the ground, as seen in FIGS. 9 to 12.

The approach to the drop area can be somewhat higher (or lower) than the desired drop altitude at the time for release or drop of the cargo so that it will contact the ground in a vertical sustained position on its impact board 22.

The layers of crushable material 23 between the impact board 22 and the cargo bundle 17 prevent damage to cargo within the bundle upon impact of the board 22 with the ground.

I claim:

1. In a low altitude aerial cargo bundle delivery system for an aircraft having a rear cargo bundle delivery opening, a cargo bundle disposed within the aircraft for extraction through said rear cargo delivery opening, a parachute packed in predetermined diameter reefed condition, a cargo bundle extraction and suspension line connected to said parachute at one end and to the cargo bundle at its other end and extending into said aircraft, calibrated breakaway means connected to said cargo suspension and extraction line intermediate its ends and to the aircraft for tethering the reefed parachute behind the aircraft during and after deployment thereof in reefed condition to prevent extraction of the cargo bundle through said rear cargo delivery opening by the reefed parachute, releasable parachute pack supporting means for releasably suspending the packed reefed parachute adjacent the rear of the cargo bundle for free fall behind the aircraft into the slipstream and reefed deployment thereof behind the aircraft, selectively operable release means within the aircraft for releasing said parachute pack supporting means for deployment of the parachute in said pack in tethered reefed condition behind the aircraft, dereefing means carried by the reefed parachute, means within the aircraft for selectively dereefing the tethered reefed parachute at any time for full deployment thereof and extraction of the cargo bundle from the aircraft by the increased drag thereof, said calibrated breakaway connecting means being sufficient to resist drag of said tethered parachute when deployed in reefed condition but not sufficient to resist drag extraction of the cargo bundle from the aircraft when said parachute is fully deployed to its dereefed condition.

2. A low altitude aerial cargo bundle delivery system for cargo delivery aircraft having a rear cargo delivery opening and a rear cargo receiving supporting and delivery ramp for opening and closing said opening, a cargo bundle adapted to be supported on and extracted from said ramp, a cargo bundle extraction and suspension line connected at one end to said cargo bundle, a calibrated breakaway connection connected at one end to said extraction and suspension line and adapted to be connected at its other end to the aircraft ramp in front of said cargo bundle when disposed on the ramp at the rear end thereof, a packed reefed parachute having a predetermined reefed diameter connected to the other end of said extraction and suspension line, releasable supporting means carried by the cargo bundle for releasably supporting said packed parachute at the rear of the cargo bundle for free fall behind the ramp into the aircraft slipstream when released, for deployment of said parachute in reefed condition tethered by said extraction and suspension line and said calibrated breakaway means behind the aircraft, parachute dereefing means carried by the parachute for dereefing and full deployment of said parachute, said calibrated breakaway means having a predetermined break strength sufficient to resist drag force of said parachute when deployed in said reefed condition but not sufficient to resist the drag force of said parachute when fully deployed in its dereefed condition, means for operating said releasable supporting means from within the aircraft for deployment of said parachute in said reefed condition, and separate means adapted to be selectively operated from within the aircraft for dereefing said parachute after the parachute has been deployed behind the aircraft in its reefed condition.

3. A low altitude aerial cargo bundle delivery system for cargo delivery aircraft having a rear delivery opening and a rear cargo receiving and delivery ramp comprising, a cargo bundle adapted to be disposed on the rear of said ramp for aerial delivery by parachute at a predetermined low altitude for impact with the ground within a predetermined small impact area, cargo bundle extraction and suspension line means connected at one end to said cargo bundle for extracting the cargo bundle off the ramp behind the aircraft, a packed parachute, releasable reefing means on said parachute reefing said parachute to a predetermined reefed diameter including a deployment pack therefor and connected to the other end of said extraction and suspension line means, releasable supporting means supporting said packed reefed parachute in back of said cargo bundle for free fall into the slipstream below the ramp when released for normal deployment in reefed condition, means carried by said cargo bundle for selectively releasing said supporting means to drop said packed parachute behind said cargo bundle for deployment in reefed condition, a calibrated breakaway connection connected to said extraction and suspension line means and adapted to be connected to the floor of the ramp forwardly of said cargo bundle for tethering the reefed parachute to the aircraft to prevent extraction of the cargo bundle thereby off the ramp by the drag of the reefed parachute after deployment in reefed condition, said calibrated breakaway connection having a predetermined limited break strength sufficient to resist drag of the parachute when deployed in reefed condition but not sufficient to resist drag of said parachute when dereefed and fully deployed at a predetermined air speed, parachute dereefing means carried by the parachute for selectively dereefing the parachute for full deployment thereof to break said calibrated breakaway connecting means and extract said cargo bundle off the ramp for suspension and descent thereby into the aforesaid impact area, energizing means for actuating said releasable supporting means adapted to be disposed within the aircraft to release said parachute supporting means for dropping the packed parachute from the cargo bundle for reefed deployment into the airstream behind the ramp, and separate energizing means connected within the aircraft for selectively dereefing said parachute from within the aircraft for full deployment and increased drag thereof for breaking said calibrated breakaway connecting means and extracting the cargo bundle off said ramp and controlled descent thereby into said impact area.

4. An aerial cargo bundle delivery apparatus as set forth in claim 3 in which said cargo bundle is secured to an impact board at its bottom and includes a crushable supporting layer between said bottom and said impact board, crushable upon impact with the surface of said impact area, and includes a skid board secured to the cargo bundle on one side thereof in which said bundle is adapted to rest on its side on said skid board on the ramp with said impact board facing forward in the aircraft, said releasable supporting means including an electrically initiated parachute supporting cord cutter disposed adjacent the impact board, and said parachute supporting means comprises a supporting cord passing through said cutter to be cut thereby and over the upper side of the cargo bundle when disposed on its skid board on the ramp with the parachute supporting cord connected at its outer end to the parachute pack for supporting the pack on the side of the cargo bundle opposite said impact board, and said cargo bundle extraction and suspension line means connected between the top of the cargo bundle opposite said impact board and extends under the skid board and is connected to the calibrated breakaway connecting means at one end thereof and apadted to be connected at its other end to a conventional hold down ring in the floor of the ramp located forward of the cargo bundle impact board when the cargo bundle is resting on the skid board at the rear end of the ramp.

5. An aerial delivery system as set forth in claim 4 in which said parachute comprises a ring slot parachute of about 22 feet diameter, reefed by a reefing line around its skirt to about 4 feet diameter when deployed in reefed condition to allow the chute to fully deploy in reefed condition to take up any slack in the extraction and suspension line between the parachute and said calibrated break away connection and become tethered behind cargo aircraft until it is desired to extract the cargo during the approach toward the cargo impact area at a predetermined altitude and air speed, and said parachute carries an electrically energized reefing line cutter for severing the reefing line to allow the chute to expand to its maximum diameter to break the calibrated breakaway connection means and extract the cargo bundle off the ramp, and includes an electric energizing circuit for said reefing line cutter extending from the reefing line cutter along one of the parachute shroud lines and said extraction and suspension line into the cargo aircraft and energizing means within the aircraft for selectively energizing said circuit from within the aircraft to cause operation of said reefing line cutter.

6. Apparatus as set forth in claim 5 in which the aircraft has an electric ready signal means and a jump signal means therein selectively operable by personnel within the aircraft and said parachute pack supporting cord cutter includes an energizing circuit therefor adapted to be connected to said ready signal means for energization thereof, and said parachute reefing line cutter circuit is connected to said jump signal means within the aircraft for energization thereof.

7. In combination with an aerial cargo delivery aircraft having a rear cargo receiving and delivery opening and ramp, parallel spaced roller conveyors fixed on the floor of said ramp extending from within the aircraft to the rear end of the ramp, a cargo hold down securing ring fixed to the floor of the ramp between the spaced roller conveyors, and separate electric circuit signal means for indicating get ready and jump signal indications for use with paratroop jump maneuvers, a cargo bundle supporting skid board disposed on said roller conveyors for rearward displacement thereof off said ramp, a calibrated breakaway connection secured at one end to said ring in forwardly spaced relation in front of said skid board, a cargo bundle extraction and suspension line having an intermediate portion passing under said skid board and fastened intermediate its length to said breakaway connection to resist predetermined rearward pull on said suspension and extraction line, a cargo bundle to be extracted from said ramp secured on its side on said skid board with the top of the cargo bundle facing rearwardly outward of said opening, said intermediate portion of said cargo bundle extraction and suspension line extending from said breakaway connection rearwardly under said skid board having one end thereof connected to the top of the cargo bundle for extraction and suspension thereof by said extraction and suspension line, a parachute packed in predetermined reefed drag area diameter connected to the other end of said intermediate portion of said load extraction and suspension line, a parachute pack supporting line supporting said packed parachute on the top end of said cargo bundle above said extraction and suspension line connection therewith when said cargo bundle is resting on its side on said skid board at the rear end of the ramp for free drop and deployment in back of the ramp when said supporting line is severed, a supporting line cutter for severing said supporting line carried by said cargo bundle, an energizing circuit for actuating said supporting line cutter connected to said get ready signal means for energization thereby, a reefing line cutter fixed on said parachute for cutting said reefing line to dereef said parachute for maximum deployment therof, an energizing circuit for said reefing line cutter for energization thereof to sever said reefing line and extending from said parachute reefing line cutter along said cargo bundle extraction and suspension line and under said skid board and connected to said jump signal means for selectively dereefing said parachute at any selected time after said chute has been deployed in reefed condition, said calibrated breakaway connection having a predetemined break strength sufficient to resist the drag of said parachute on said extraction and suspension line after deployment thereof in reefed condition at a predetermined airspeed, said breakaway connection not being sufficient to resist breaking thereof and extraction of said cargo bundle and skid board by drag of said parachute when fully dereefed and deployed to its maximum drag diameter at said predetermined airspeed.

8. Apparatus as set forth in claim 7 including an impact cushioning means secured to the bottom of the cargo bundle for cushioning the impact of the cargo bundle with the impact area during descent while suspended from said parachute.

9. Apparatus as set forth in claim 8 in which said load extraction and suspension line is about 20 feet long and connected to the shroud lines of a 22 feet diameter extraction parachute, reefed to about 4 feet diameter, and said drop altitude is about 200 feet at an air speed of about 130 knots, and said cargo bundle weighs between 500 and 1500 pounds.

References Cited
UNITED STATES PATENTS

| 3,049,322 | 9/1962 | Vlasic | 244—152 |
| 3,276,729 | 10/1966 | Jacobs | 244—137 |

FOREIGN PATENTS

| 957,849 | 5/1964 | Great Britain. |

MILTON BUCHLER, *Primary Examiner.*

T. W. BUCKMAN, *Assistant Examiner.*